United States Patent
Subbiah et al.

(10) Patent No.: US 10,230,688 B1
(45) Date of Patent: Mar. 12, 2019

(54) VIRTUAL FABRIC DISCOVERY FOR REMOTE LOGIN

(71) Applicant: Dell Products LP, Round Rock, TX (US)

(72) Inventors: Ramesh Kumar Subbiah, Chennai (IN); Vibin Varghese, Chennai (IN); Saravanan Obulisami, Chennai (IN)

(73) Assignee: Dell Products LP, Round Rock, TX (US)

( * ) Notice: Subject to any disclaimer, the term of this patent is extended or adjusted under 35 U.S.C. 154(b) by 0 days.

(21) Appl. No.: 15/702,618

(22) Filed: Sep. 12, 2017

(51) Int. Cl.
*H04L 29/12* (2006.01)
*H04L 12/24* (2006.01)

(52) U.S. Cl.
CPC .......... *H04L 61/2596* (2013.01); *H04L 41/12* (2013.01); *H04L 61/6022* (2013.01)

(58) Field of Classification Search
CPC ............................ H04L 61/2596; H04L 41/12
See application file for complete search history.

(56) References Cited

U.S. PATENT DOCUMENTS 8,711,864 B1 * 4/2014 Ko .......................... H04L 12/28

* cited by examiner

*Primary Examiner* — Ronald B Abelson
(74) *Attorney, Agent, or Firm* — Staniford Tomita LLP (57) ABSTRACT

Embodiments for connecting a host device to target devices in a network through a switch of a plurality of switches, by: defining a special zone for targets that are not directly connected to the switch having the host; directly through the switch; discovering all targets connected to all ports of switch and other switches through a device discovery process; creating a switch-to-target mapping table for all discovered targets; sending a virtual discovery command to all the discovered host-target pairs using the switch-to-target mapping table; creating a virtual address translation table that maps an ID and address of the host to virtual IDs and addresses assigned for network ports of each host-target pairs; and transmitting network traffic between the host and target using the virtual address translation table.

18 Claims, 8 Drawing Sheets

Host Address Translation Table

| Host | Target | Local FCID | Local FCOE MAC | Virtual FCID | Virtual FCOE MAC |
|------|--------|------------|----------------|--------------|------------------|
| H1WWN | T2WWN | 11-F1-00 | H1-FCOE-MAC1 | 22-F1-01 | NP1-FCOE-MAC2 |
| H1WWN | T3WWN | 11-F1-00 | H1-FCOE-MAC1 | 33-F1-01 | NP2-FCOE-MAC2 |

VIRTUAL FABRIC DISCOVERY FOR REMOTE LOGIN

TECHNICAL FIELD

Embodiments are generally directed to large-scale, Fibre Channel storage networks, and more specifically to providing a virtual fabric discovery (FDISC) for remote logins.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Modern computer data storage systems, such as storage area networks (SAN) in enterprise environments often use the Fibre Channel (FC) network technology to provide high-speed (e.g., 2 to 32 gigabit/second) data transfers. A Fibre Channel network comprises a number of ports that are connected together, where a port is any entity that actively communicates over the network (either optical fiber or copper), where a port is usually implemented in a device such as disk storage or a Fibre Channel switch. The Fibre Channel protocol transports SCSI commands over Fibre Channel networks, and network topologies include point-to-point, arbitrated loop (devices in a ring), and switched fabric (devices/loops connected through switches).

A Fibre Channel port is generally any entity that actively communicates over the network and is usually implemented in a device such as disk storage, a Host Bus Adapter (HBA), network connection on a server, or a switch. Fibre Channel ports come in a variety of logical configurations. Common types of ports include N_Port (Node port), which is typically an HBA port that connects to an F_Port or another N_Port; F_Port (Fabric port), which is a switch port that is connected to an N_Port and connects the FC fabric to a node; or E_Port (Expansion port), which is a switch port that attaches to another E_Port to create an inter-switch link and is used to cascade FC switches together.

Fibre channel networks are often used to implement large-scale networks such as combined data center and storage networks. Such networks comprise at least two types of network traffic (e.g., data center and storage traffic) and a number of different host and target devices. Appropriate switches, known as Fibre Channel Forwarder (FCF) switches, are required to de-encapsulate and forward traffic to their respective networks. In typical FCF switches, the hosts and target must be connected to same switch or input/output module (IOM). Hosts generally cannot talk with targets present in different IOMs. This shortcoming has traditionally been addressed by using the E_Port (Expansion Port) mechanism within the Fibre Channel network topography. The E_Port mechanism, however, is generally a costly feature to include in a switch. Thus, many switches, such as inexpensive switches built for economy, do not provide E_Port functionality. For switches that do not have E_Port functionality, hosts cannot talk to targets that are not in the same switch.

What is needed, therefore, is a mechanism that allows hosts connected to one FCF switch to login to targets connected to different FCF switches without requiring the use of expansion or extender ports (E_Ports).

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain, and Dell Networking trademarks of Dell/EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the described embodiments.

Disclosed herein are methods and systems of allowing hosts connected to one switch in a Fibre Channel network to login to targets connected to different switches without requiring the use of E-Ports or similar types of expansion ports. Such embodiments use proxy fabric discovery (FDISC) operations generated from the switches node or network ports (N-ports) for each unique Host-Target pair. Embodiments include the use of zones to define different domains, where special zones linking hosts and targets through disparate switches are defined using tags. A special zone contains at least one host and a target, where the host is connected to one switch, and the target is connected to a different. From the switch perspective, the host and target are connected to each other through this special zone, whereas in a normal zone, they are not connected. The special zone creates a virtual FDISC operation that allows for remote login of the host to the target through a switch that does not contain both host and target.

Figure 1:
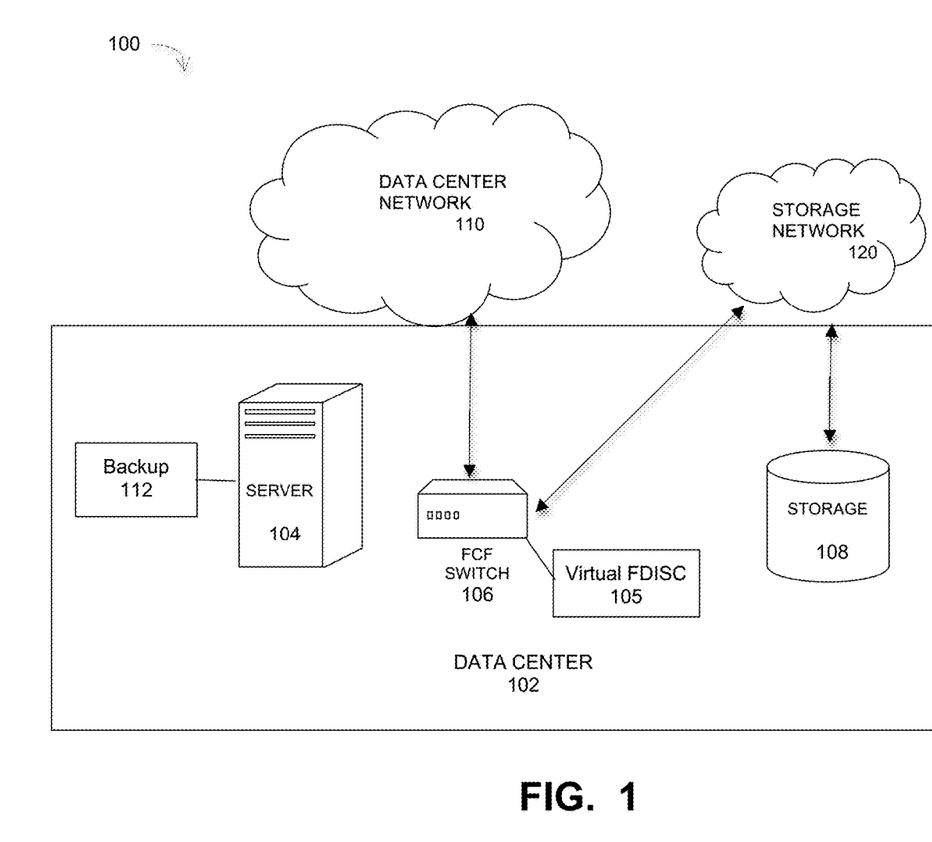
FIG. 1 illustrates a Fibre Channel network system that implements one or more embodiments of a virtual fabric discovery (FDISC) mechanism for remote login of a host to a target, under some embodiments.

FIG. 1 illustrates an example network that implements a virtual FDISC for remote login of a host to target, under some embodiments. System 100 illustrates an enterprise-scale data processing system in which a data center 102 is coupled to a data center network 110 and a storage network 120 for the backup and storage of data. The data center 102 includes a server 104 that performs certain data processing operations, such as data backup processes 103. The data is processed in resources provided by data center network 110. The data is stored in data storage 108, that is accessed through a storage network 120. In an embodiment, the data center processes data through databases and may run certain database applications, such as SAP, Microsoft SharePoint, Virtual Desktop Infrastructure (VDI), Hadoop, or other applications.

In system 100, the server 104 may represent any number of servers, at least some of which perform specific data processing functions. For the example embodiment of FIG. 1, server 104 is a backup server that executes a backup management process 112 that coordinates or manages the backup of data from one or more data sources, such as client computers within the data center network 110 and operated by network users to storage devices 108 in a storage area network (SAN) 120 that includes storage such as HDD (hard disk drives), SSD (solid state drives) and/or virtual storage devices. The network storage devices serve as target storage devices for data backed up from one or more data sources. In an embodiment, the storage devices comprise disk arrays having RAID controller cards that use the PCI Express (PCIe) high-speed serial bus standard, though embodiments are not so limited For the embodiment of FIG. 1, the client computers are coupled to the backup server 104 over an Ethernet network 104, though any other type of network may also be used. Also for the embodiment of FIG. 1, the backup server 104 is coupled to the storage devices 108 through Fibre Channel (FC) switch 106 to a Fibre Channel (FC) network 120 that includes nodes that may be embodied as DDR (Data Domain Replicator) nodes to provide network-efficient, encrypted replication for disaster recovery and backup, or other similar type of SAN nodes. Each node comprises an FC Host Bus Adapter (HBA) that has ports (e.g., two ports denoted port1 and port2), with a number of storage devices (e.g., HDD or SSD). The backup server 104 takes user data from clients and then passes it to the DDR nodes using appropriate network protocols, such as SCSI (small computer system interface) protocols.

As shown in FIG. 1, storage area network (SAN) 120 provides connectivity to the various systems, components, and resources of system 100, and is implemented using FC protocols. For the FC network of FIG. 1, one or more host bus adapters (HBA) connect the host system to the other network and storage devices 108. The term host bus adapter generally refers to an FC interface card. Each HBA has a unique World Wide Name (WWN), which is similar to an Ethernet MAC address, but are longer (8 bytes). There are two types of WWNs on a HBA; a node WWN (WWNN), which is shared by all ports on an HBA, and a port WWN (WWPN), which is unique to each port.

The data generated or sourced by system 100 may be stored in any number of persistent storage locations and devices, such as in SAN 120, and the backup process 103 causes or facilitates the backup of this data to these storage devices, which may at least be partially implemented through storage device arrays, such as RAID components. As stated above, in an embodiment, system 100 may represent a Data Domain Restorer (DDR)-based deduplication storage system, and backup server 103 may be implemented as a DDR deduplication Storage server provided by EMC Corporation. However, other similar backup and storage systems are also possible. Although described with respect to SAN networks, it should be noted that system 100 may be implemented to provide support for various storage architectures such as Network-attached Storage (NAS), or Direct-attached Storage (DAS) that make use of large-scale network accessible storage devices 114, such as large capacity disk (optical or magnetic) arrays.

As stated above, in an embodiment, system 100 and the networks 110 comprise Fibre Channel (FC) network links along with other network technologies, such as Ethernet, WiFi, direct connection, and so on. The data center 102 also contains a number of switches, such as switch 106 that connect host and target computers together to form the Fibre Channel fabric, mesh networks, and other connections and device links. For the embodiment of FIG. 1, data provided to the data center 102 may be mixed or converged data from the data center network 110 and the storage network 120. In this case, switch 106 is a Fibre Channel Forwarder (FCF) switch that de-encapsulates the two types of traffic and forwards them to their respective networks. Such a switch may be embodied as a Dell Networking MXL/IOA switch, though embodiments are not so limited.

In an embodiment, system 100 includes a virtual FDISC remote login process 105 that creates effective virtual connections between hosts and targets that are not physically connected to each other through a switch 106. Process 105 is generally implemented as part of the FCF switch 106, as shown in FIG. 1, or it may be an executable module executed by the one or more switches in the network. Alternatively, it may be embodied as a hardware component or circuit provided in the system and integrated as part of the switch or other component. Although only one FCF switch is shown in FIG. 1, it should be noted that many such switches may exist within data center 102.

Figure 2:
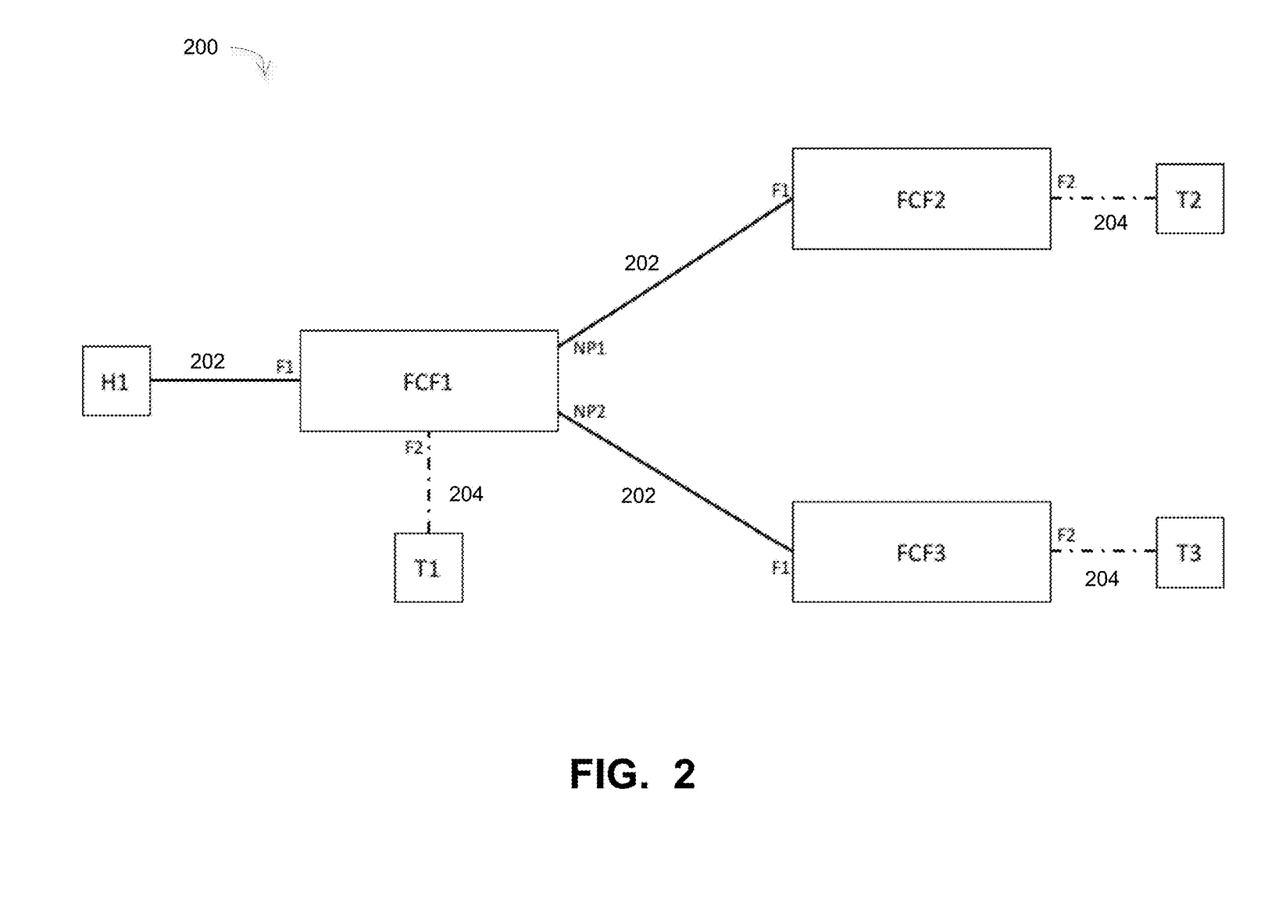
FIG. 2 illustrates an example topology of a Fibre Channel network implementing a virtual FDISC remote login process, under some embodiments.

FIG. 2 illustrates an example topology of a Fibre Channel network 200 implementing a virtual FDISC remote login process, under some embodiments. As shown for network 200, a host computer or device, denoted H1, is connected to a number of target devices denoted T1, T2, and T3. These devices are connected through a number of FCF switches denoted FCF1, FCF2, and FCF3 through appropriate network links. The network links comprise Ethernet links 202 (shown as solid lines) and Fibre Channel links 204 (shown as dashed lines). For the embodiment of FIG. 2, each FCF switch is a type of switch that accepts the Fibre Channel frame that is encapsulated in an Ethernet packet and forwards that packet over an FC network or an FCoE (Fibre Channel over Ethernet) VLAN (virtual local area network) across an Ethernet network to a remote FC or FCoE end device, such as targets (T1 to T3).

In an embodiment, FIG. 2 illustrates the use of Fibre Channel technology to implement the data center/storage network of FIG. 1 to create a storage area network (SAN) to connect servers to storage. The SAN is a dedicated network that enables multiple servers to access data from one or more storage devices. Enterprise storage uses the SAN to backup to secondary storage devices including disk arrays, tape libraries, and other backup while the storage is still accessible to the server. Servers may access storage from multiple storage devices over the network as well. SANs are often designed with dual fabrics to increase fault tolerance. Two completely separate fabrics are operational and if the primary fabric fails, then the second fabric becomes the primary.

FIG. 2 represents an example network that comprises a switched fabric or switching fabric topology in which network nodes (hosts and targets) interconnect via one or more FC network switches (FCFs). The switches are generally costly hardware devices and do not always offer advanced connection features, such as expansion or extension ports. Visibility among the nodes in a fabric is typically controlled with Fibre Channel zoning. In general, zoning is the partitioning of an FC fabric into smaller subsets to restrict interference, add security, and to simplify network management. While a SAN makes available several devices and/or ports to a single device, zoning allows each system connected to the SAN should only be allowed access to a controlled subset of these devices/ports. Zones can be implemented through either a hard or soft method that combine with two sets of attributes, name and port. The fabric name service allows each device to query the addresses of all other devices. Soft zoning restricts only the fabric name service, to show only an allowed subset of devices. In this method, when a server looks at the content of the fabric, it will only see the devices it is allowed to see. However, any server can still attempt to contact any device on the network by address. In contrast, hard zoning restricts actual communication across a fabric. This requires frame filtering in the fabric switches.

Zoning can be applied to either the switch port a device is connected to, or the WWN on the host being connected (name zoning). Port-based zoning restricts traffic flow based on the specific switch port to which a device is connected, so if the device is moved it will lose access. Furthermore, if a different device is connected to the port, it will gain access to any resources of the previous host. In contrast, name-based zoning restricts access by a device's WWN. In this case, the WWN is on the host, so the port the host is connected to can be moved and access will still be preserved, and connecting a new device into a port previously used by a WWN zone device will not convey any access to the previous device's resources.

In general, zones define a membership group of the hosts and targets comprising the nodes in the system. For the embodiment of FIG. 2, hosts and targets that are not connected to each other through an FCF switch cannot communicate unless an E_Port is provided by the switch. Thus, for the example network topology 200, Host H1, connected to FCF1, can only communicate with Target T1, if E-Port is not supported by this switch. For MXL/IOA switches, and other similar switches, the E-Port feature is generally not supported. In an embodiment, the virtual FDISC remote login process 105 provides a solution where the Host H1 could talk with Target T2 connected to FCF2 and Target T3 connected to FCF3 without requiring or using E-Port functionality. In an embodiment, process 105 adds a zone with a special tag on the FCF switch, where the special zone contains the host and remote target WWN. This special tag is used only for zones which have targets not directly connected to the FCF. Other FCF switches do not need a special tag in the zone, and should have the NP port WWN in addition to the target's WWN.

In an overview of the process, the NP1 and NP2 ports (Ethernet ports) of FCF1 will login to connected FCF switches as an end device. Using new periodic FIP messages, the FCF1 will request and learn the targets from the other FCF switches. This information is maintained in a software table (NP-Target Mapping Table) by FCF1 and is used to sending virtual FDISC operations for each Host-FCF pair derived from the zoning and NP-Target Mapping Table. Based on the Virtual FDISC response, a Host Address Translation Table is formed that contains a mapping of the host's FCID, FCOE MAC addresses with Virtual FCID, FCOE MACs assigned for the NP ports for each of the Host-Target pairs. Entries in this Host Address Translation Table will be used to translate the address for all subsequent FCOE traffic to and from the host (e.g., H1). In general, the FCID comprises an identifier allotted by the FCF switch to end hosts during a login process for a respective device.

In an embodiment, the messages comprise FIP (FCoE Initialization Protocol) messages, where FIP is the FCoE control protocol responsible for establishing and maintaining Fibre Channel virtual links between pairs of FCF switches. During the virtual link establishment phase, FIP first discovers FCoE VLANs and remote virtual FC interfaces; it then performs virtual link initialization functions, such as fabric login (FLOGI) and fabric discovery (FDISC). After the virtual link is established, Fibre Channel payloads can be exchanged on the virtual link, and FIP remains in the background to perform virtual link maintenance functions. In an embodiment, the FLOGI is a Fibre Channel Extended Link Service command that is used to establish a session between a node port and the fabric. When FLOGI is accepted, the fabric assigns an N_Port_ID to the node port.

In an embodiment, the FDISC discovery process establishes known connections for subsequent logins from the same node for different users, applications, or virtual machines after a node performs an initial FLOGI to log in to a switch. N_Ports send FC FDISC messages to the FC switch and VN_Ports send FIP FDISC messages to the FCF. After an N_Port acquires its initial N_Port ID through the FC FLOGI process, it can acquire additional N_Port IDs by sending an FC FDISC with a new worldwide port name and a source ID of 0x000000. The new port name and blank source ID tell the FC switch to assign a new N_Port ID to the N_Port. The different N_Port IDs allow multiple virtual machines or users on the N_Port to have separate, secure virtual links on the same physical N_Port. These additional ports are also referred to as VN_Ports. FIP FDISC works the same way, except the VN_Port logs in using a FIP FLOGI message. FC and FIP FDISC messages serve the same function in FC and FCoE networks, respectively.

Figure 3:
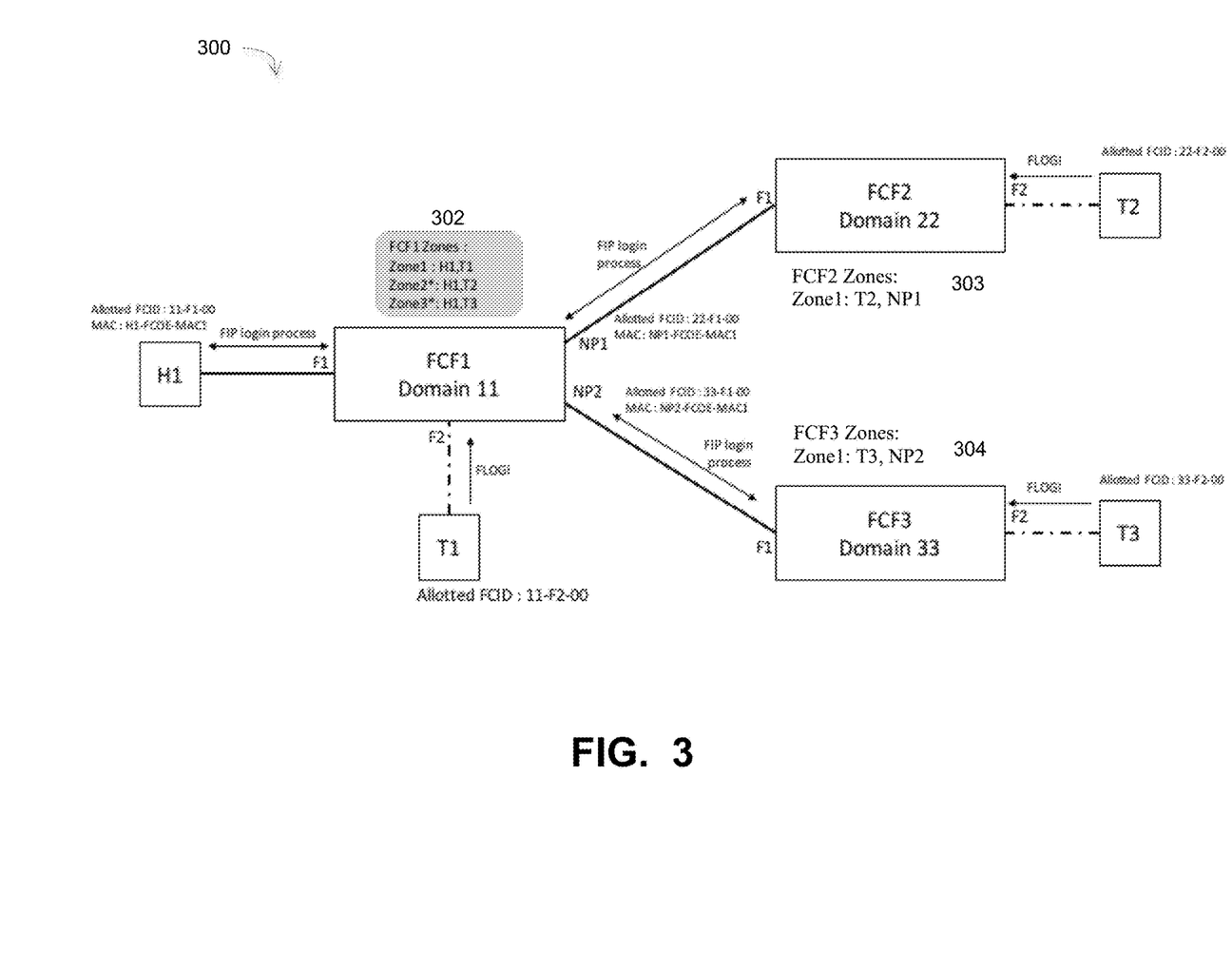
FIG. 3 illustrates the network of FIG. 2 with zones defined each example FCF switch, under an embodiment.

FIG. 3 illustrates the network of FIG. 2 with zones defined each example FCF switch, under an embodiment. As shown in network diagram 300 of FIG. 3, Each FCF is assigned a respective domain (e.g., as denoted Domain 11, Domain 22, and Domain 33). After the FIP login process, Host H1 is assigned an allotted Fibre Channel ID (FCID) and MAC address (e.g., Allotted FCID: 11-F1-00, MAC: H1-FCOE-MAC1). After the FLOGI procedure, each target T1, T2, and T3 are assigned respective allotted FCIDs (e.g., 11-F2-00, 22-F2-00, and 33-F2-00). For the embodiment of FIG. 3, each FCF switch has a respective zone or set of zones 302 to 304. The zones include standard zones that include targets that are directly connected to the switch, and one or more special zones (denoted with an asterisk *) for remote connection to non-connected targets. Thus, as shown for FCF1, the FCF1 zones 302 include Zone1: H1, T1, Zone 2: H1, T2, and Zone 3: H1, T3, where Zone 2 and Zone 3 are special zones since H1 is not directly connected to either T2 or T3; the FCF2 zones 303 include Zone 1: T2, and NP1 of FCF1; and the FCF3 zones include Zone 1: T3, and NP2 of FCF1. In FIG. 3, Zones 2 and 3 of FCF1 are special zones and Zone 1 for each of FCF1 to FCF3 are standard zones.

Figure 4:
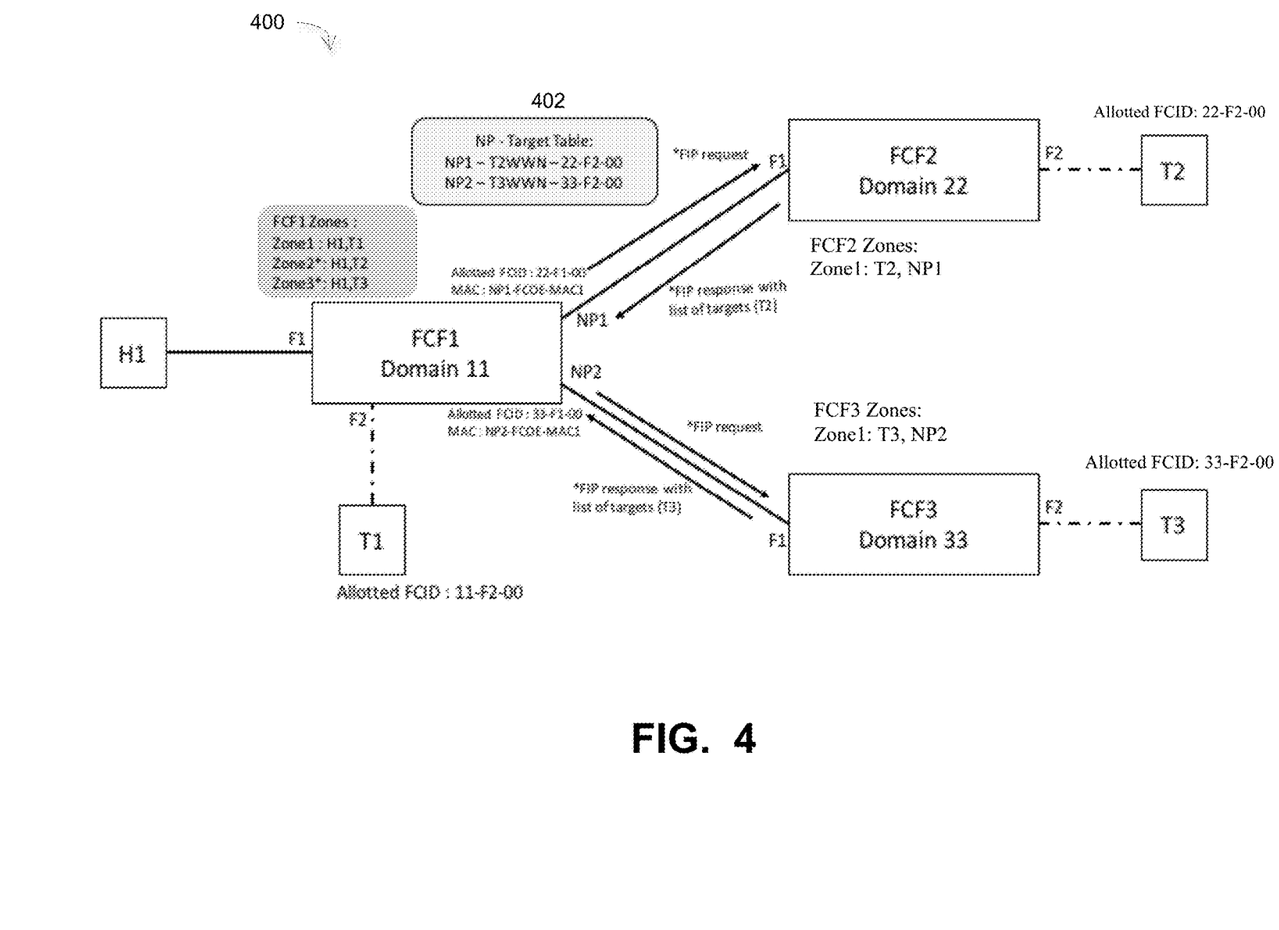
FIG. 4 illustrates the network of FIG. 3 after a Host H1 login procedure, under an example embodiment.

FIG. 4 illustrates the network of FIG. 3 after a Host H1 login procedure, under an example embodiment. For network diagram 400, the login process uses the special zone configuration shown for FCF1 so that after Host H1 logs in, based on the special zones FCF1 Zone2 and FCF1 Zone3, the FCF1 NP1 and NP2 ports will send a special FIP request to get list of available targets for each port. Based on the FIP response, the NP port to target table (NP-Target Table) 402 will get populated. As shown in FIG. 4, after login of Host H1, FCF1 sends an FIP request to each of FCF2 and FCF3 over respective ports NP1 and NP2. FCF2 sends back an FIP response with a list of its targets (e.g., T2), and FCF3 sends back an FIP response with a list of its targets (e.g., T3). The example target table 402 is then populated with the entries for NP1 and NP2, where NP1 has the T2 WWN and allotted FCID 22-F2-00 for T2; and NP2 has the T3 WWN and allotted FCID 33-F2-00 for T3.

Figure 5:
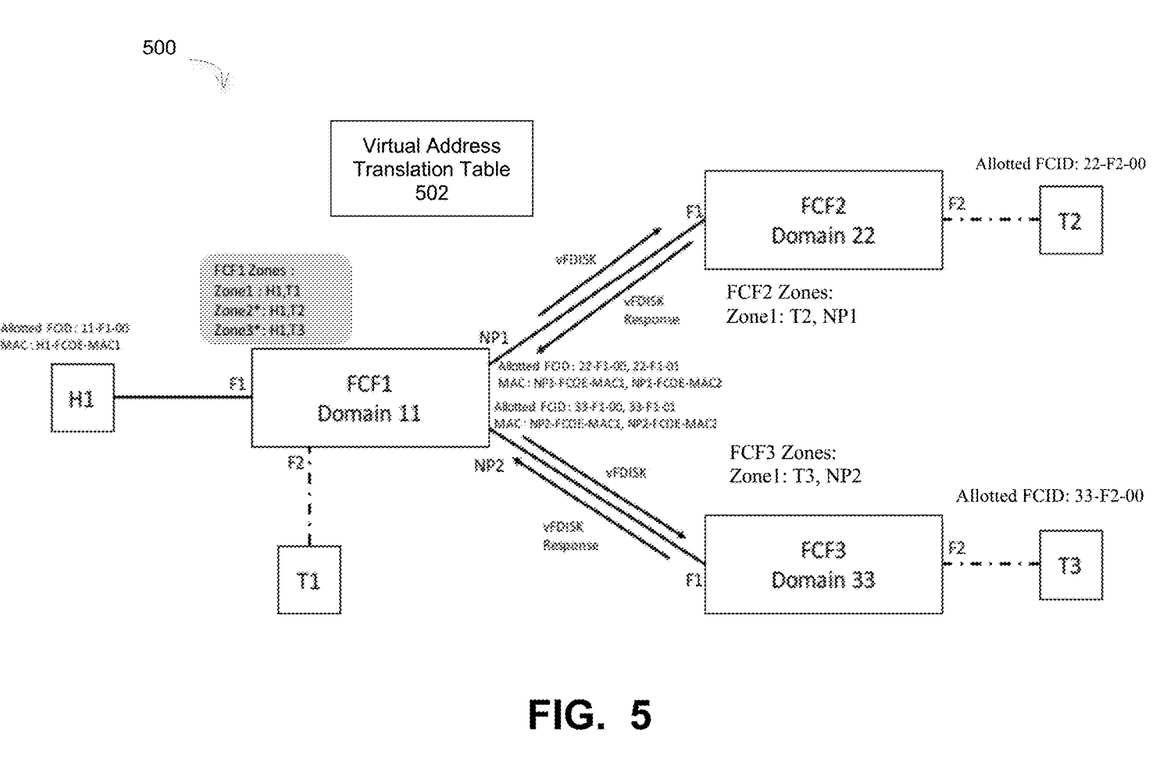
FIG. 5 illustrates the network of FIG. 4 after population of a virtual address translation table, under an example embodiment.
Figure 6:
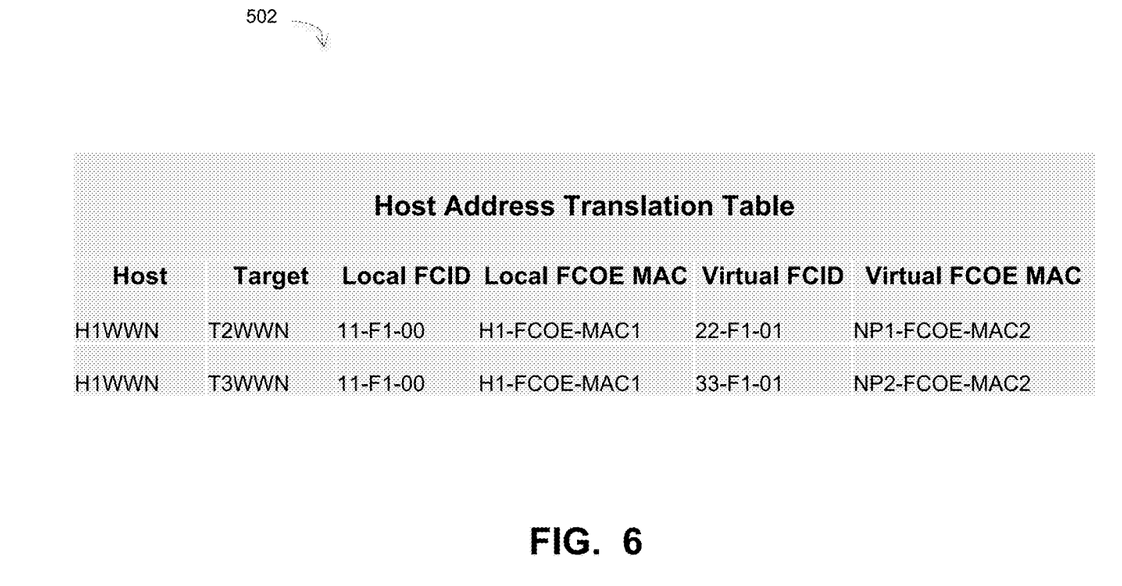
FIG. 6 illustrates an example virtual address translation table 502 for the network of FIG. 5, under an example embodiment.

In an embodiment, process 105 comprises a virtual FDISC process that populates a virtual address translation table. FIG. 5 illustrates the network of FIG. 4 after population of a virtual address translation table, under an example embodiment. As shown for network diagram 500, a virtual FDISC (vFDISC) command is sent for every Host-FCF pair on the NP ports NP1 and NP2. Based on the vFDISC response, a virtual address translation table 502 will be populated and a registered state change notification (RSCN) will be sent to H1. Entries in the virtual address translation table will then be used to translate the address for all subsequent FCoE traffic to and from Host H1. FIG. 6 illustrates an example virtual address translation table 502 for the network of FIG. 5, under an example embodiment. The virtual address changes the FCID and FCOE MAC in both directions (from actual to virtual and from virtual to actual) on the FCF switch (e.g., FCF1) where the special zone is configured. The operation of the process to generate the virtual address translation table is shown in Table 1 below:

TABLE 1

| Local FCID | ← → | Virtual FCID |
| Local FCOE MAC | ← → | Virtual FCOE MAC |

For the example of FIGS. 5 and 6, the virtual address translation table 502 maps the Host H1 to the Targets T2 and T3 by changing the local FCIDs and FCoE MAC addresses to their virtual address, as shown in Table 502 of FIG. 6.

Once the virtual address translation table is populated, it is used to translate addresses for all FCoE traffic for the host that has defined special zones. When a host (e.g., Host H1) sends packet to a target (e.g., Target T2, the sender and destination information in the packet would be (for the example of FIG. 5):
  i. Sender FCOE MAC-H1-FCOE-MAC1
  ii. Sender FCID-11-F1-00
  iii. Destination FCOE MAC-FCF1's MAC
  iv. Destination FCID-22-F2-00

On receiving this packet, FCF1 uses the Virtual Address Translation Table to change the Sender FCOE MAC and Sender FCID, respectively to the Virtual FCOE MAC and Virtual FCID.
  i. Sender FCOE MAC to Virtual FCOE MAC=H1-FCOE-MAC1 to NP1-FCOE-MAC2
  ii. Sender FCID to Virtual FCID=11-F1-00 to 22-F1-01
  iii. Destination FCOE MAC→FCF2's MAC After changing the packet's sender and destination information, the packet is sent to FCF2, which forwards the packet to Target T2. When Target T2 sends a packet to Host H1, the sender and destination information in the packet would be:
  i. Sender FCID-22-F2-00
  ii. Destination FCID-22-F1-01
The FCF2 switch will send the packet to FCF1 would be:
  i. Sender FCOE MAC-FCF2's MAC
  ii. Sender FCID-22-F2-00
  iii. Destination FCOE MAC-NP1-FCOE-MAC1
  iv. Destination FCID-22-F1-01

On receiving this packet, FCF1 uses the Virtual Address Translation Table to change the Destination FCOE MAC and Destination FCID which are virtual addresses to the actual addresses through a reverse lookup in the table:

i. Virtual FCOE MAC to H1's FCOE MAC=NP1-FCOE-MAC2 to H1-FCOE-MAC1 ii. Virtual FCID to H1's FCID=22-F1-01 to 11-F1-00 iii. Sender FCOE MAC→FCF1's MAC

After changing the packet's sender and destination information, the packet is sent to Host H1.

Figure 7:
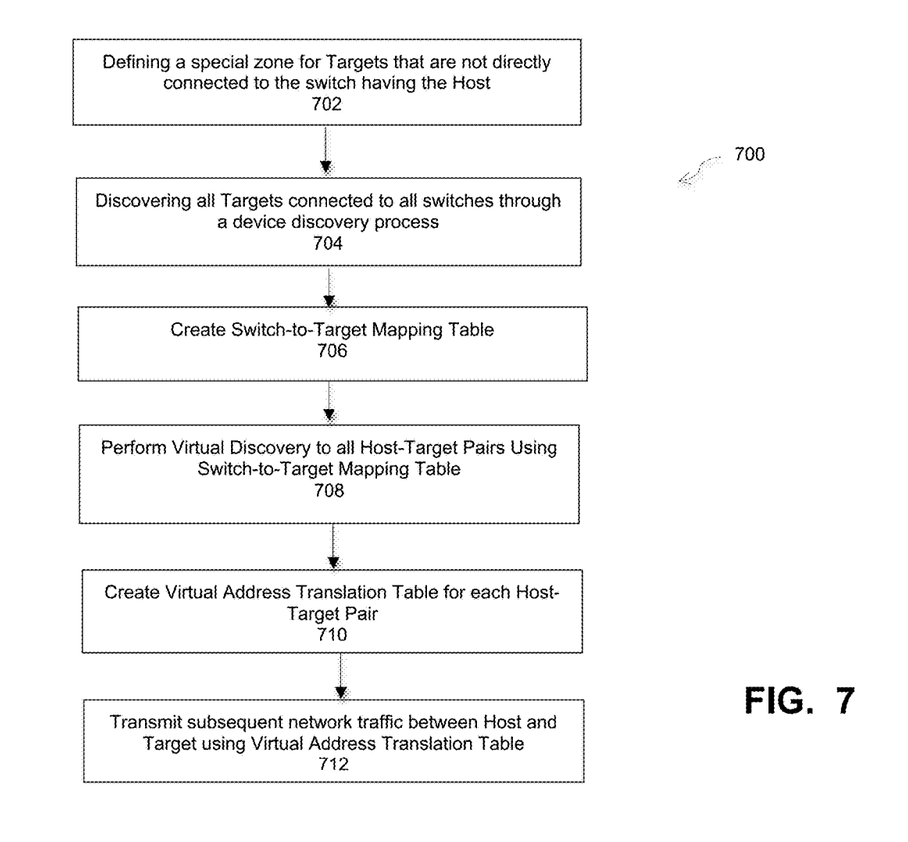
FIG. 7 is a flowchart that illustrates a method of performing virtual fabric discovery for remote login of hosts and targets in a Fibre Channel network, under some embodiments.

FIG. 7 is a flowchart that illustrates an overall method of performing virtual fabric discovery (FDISC) for remote login of hosts and targets in a Fibre Channel network, under some embodiments. Process 700 of FIG. 7 begins by defining a special zone for targets that are not directly connected to the switch host having the host, 702. The process then discovers all targets connected to all ports of switch and other switches through a device discovery process, 704, and creates a switch-to-target mapping table for all discovered targets, 706. It then sends a virtual discovery command to all the discovered host-target pairs using the switch-to-target mapping table, 708, to create a virtual address translation table that maps an ID and address of the host to virtual IDs and addresses assigned for network ports of each host-target pairs, 710. Subsequent network traffic between the host and target is then transmitted using the virtual address translation table, 712. Details of the processing of the virtual address translation table for the illustrated example are provided above.

Figure 8:
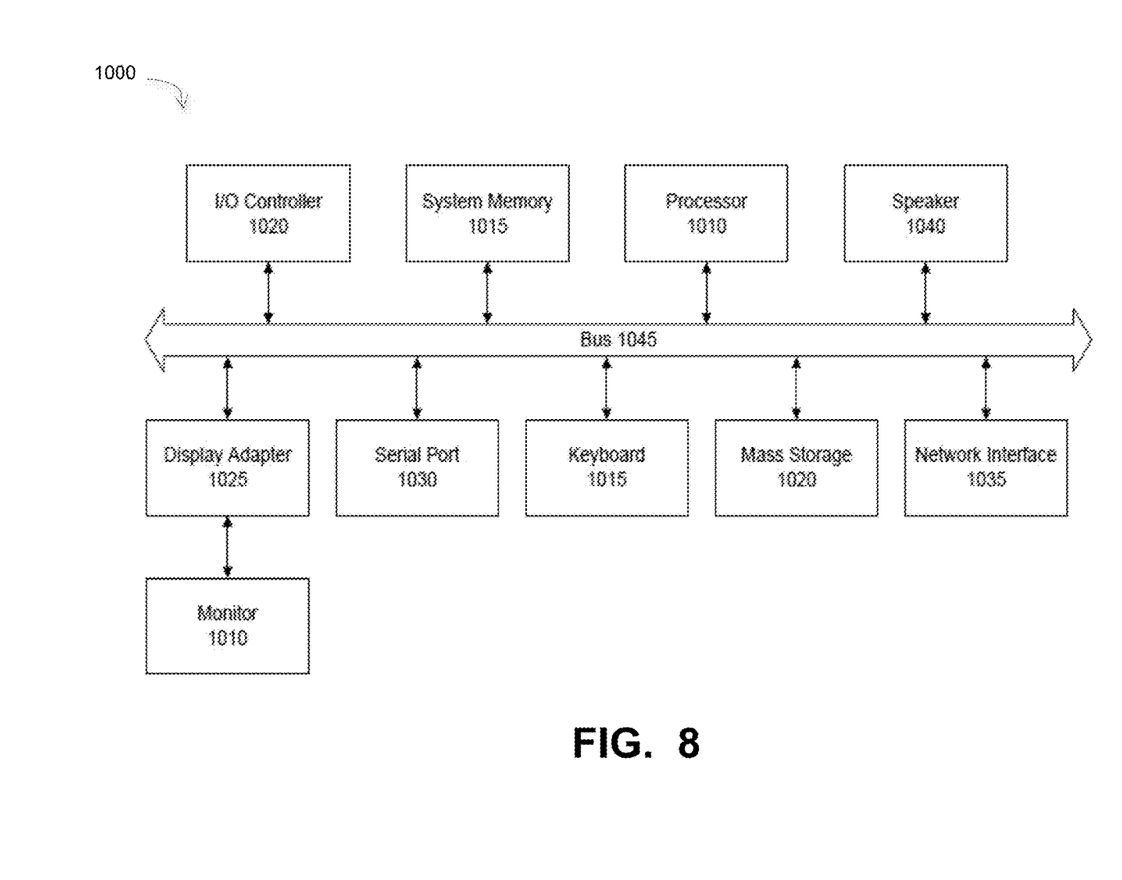
FIG. 8 shows a system block diagram of a computer system used to execute one or more software components of the at least the system of FIGS. 1 and 2, and the method of FIG. 7, under some embodiments.

The network environment of FIGS. 1 and 2 may comprise any number of individual client-server networks coupled over the Internet or similar large-scale network or portion thereof. Each node in the network(s) comprises a computing device capable of executing software code to perform the processing steps described herein. FIG. 8 shows a system block diagram of a computer system used to execute one or more software components of the present system described herein. The computer system 1005 includes a monitor 1050, keyboard 1015, and mass storage devices 1022. Computer system 1000 further includes subsystems such as central processor 1010, system memory 1005, input/output (I/O) controller 1020, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 8 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows® family of systems (e.g., Windows Server), Linux, Mac OS X, IRIX32, or IRIX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Furthermore, although embodiments are described with respect to Fibre Channel and FCoE systems, it should be noted that other transport protocols can also be adapted to use the virtualization methods described herein for other similar systems.

Embodiments may be applied to data/storage networks in any scale of physical, virtual or hybrid physical/virtual network, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform. It may also represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated and stored within the network may be stored in any number of persistent storage locations and devices, such as local client storage, server storage, or network storage. In an embodiment, the network may be implemented to provide support for various storage architectures such as storage area network (SAN), Network-attached Storage (NAS), or Direct-attached Storage (DAS) that make use of large-scale network accessible storage devices, such as large capacity tape or drive (optical or magnetic) arrays, or flash memory devices.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of connecting a host device to target devices in a network through a switch of a plurality of switches, comprising:
   defining a special zone for target devices that are not directly connected to the switch having the host;
   discovering all targets connected to all ports of switch and other switches through a device discovery process;
   creating a switch-to-target mapping table for all discovered targets;
   sending a virtual discovery command to all the discovered host-target pairs using the switch-to-target mapping table;
   creating a virtual address translation table that maps an ID and address of the host to virtual IDs and addresses assigned for network ports of each of the host-target pairs; and
   transmitting network traffic to and from the host using the virtual address translation table.

2. The method of claim 1 wherein the special zone is defined by a tag defined for the switch that labels each target device that is not connected to the host directly through the switch.

3. The method of claim 1 wherein the network comprises a Fibre Channel (FC) system implementing at least part of a data center network and a storage network.

4. The method of claim 3, wherein the switch comprises a FC host bus adapter (HBA) having multiple NP ports.

5. The method of claim 4 wherein the switch comprises a FC forwarder (FCF) switch that de-encapsulates data center network data traffic and storage network data traffic.

6. The method of claim 5 wherein the ID comprises an identifier allotted by the FCF switch to end hosts during a login process for a respective device.

7. The method of claim 6 wherein the address comprises a MAC (media access control) address for a respective device.

8. The method of claim 1 wherein the device discovery process comprises a periodic FIP (Fibre Channel over Ethernet, FCoE, Initialization Protocol) message performed after a fabric login (FLOGI) by each of the targets.

9. The method of claim 8 wherein the virtual discovery command comprises a virtual fabric discovery (vFDISC) command.

10. The method of claim 9 wherein the virtual address translation table changes the ID and address from and actual FCID to and from a virtual FCID and from and actual FCoE MAC address to and from a virtual FCoE MAC address for a sender or target comprising one of the host or target in a host-target pair.

11. A system for connecting a host device to target devices in a network through a switch of a plurality of switches, comprising:
    a first component defining a special zone for each target device that is not connected to the host directly through the switch;
    a device discoverer discovering all targets connected to all ports of switch and other switches to create a switch-to-target mapping table for all discovered targets;
    a second component sending a virtual discovery command to all the discovered host-target pairs using the switch-to-target mapping table to create a virtual address translation table that maps an ID and address of the host to virtual IDs and addresses assigned for network ports of each of the host-target pairs; and
    an interface transmitting network traffic to and from the host using the virtual address translation table.

12. The system of claim 11 wherein the special zone is defined by a tag defined for the switch that labels each target device that is not connected to the host directly through the switch.

13. The system of claim 11 wherein the network comprises a Fibre Channel (FC) system implementing at least part of a data center network and a storage network.

14. The system of claim 13, wherein the switch comprises a FC host bus adapter (HBA) having multiple NP ports, and wherein the switch comprises a FC forwarder (FCF) switch that de-encapsulates data center network data traffic and storage network data traffic.

15. The system of claim 14 wherein the ID comprises an identifier allotted by the FCF switch to end hosts during a login process, and wherein the address comprises a MAC (media access control) address for a respective device.

16. The system of claim 15 wherein the device discoverer transmits a periodic FIP (Fibre Channel over Ethernet, FCoE, Initialization Protocol) message after a fabric login (FLOGI) by each of the targets, and wherein the virtual discovery command comprises a virtual fabric discovery (vFDISC) command.

17. The system of claim 16 wherein the virtual address translation table changes the ID and address from and actual FCID to and from a virtual FCID and from and actual FCoE MAC address to and from a virtual FCoE MAC address for a sender or target comprising one of the host or target in a host-target pair.

18. A computer program product comprising a non-transitory computer usable medium having machine readable code embodied therein for connecting a host device to target devices in a network through a switch of a plurality of switches, comprising:
- defining a special zone for target devices that are not connected to the host directly through the switch;
- discovering all targets connected to all ports of switch and other switches through a device discovery process;
- creating a switch-to-target mapping table for all discovered targets;
- sending a virtual discovery command to all the discovered host-target pairs using the switch-to-target mapping table;
- creating a virtual address translation table that maps an ID and address of the host to virtual IDs and addresses assigned for network ports of each of the host-target pairs; and
- transmitting network traffic to and from the host using the virtual address translation table.

* * * * *